US007915842B2

(12) United States Patent
Nemoto et al.

(10) Patent No.: US 7,915,842 B2
(45) Date of Patent: Mar. 29, 2011

(54) ACTUATOR DRIVE CONTROL DEVICE

(75) Inventors: Hirotomi Nemoto, Wako (JP); Tetsuya Ishiguro, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1348 days.

(21) Appl. No.: 11/194,502

(22) Filed: Aug. 1, 2005

(65) Prior Publication Data

US 2006/0039095 A1    Feb. 23, 2006

(30) Foreign Application Priority Data

Aug. 20, 2004    (JP) .................................. 2004-240916

(51) Int. Cl.
*H02K 33/00*    (2006.01)

(52) U.S. Cl. ........ 318/128; 318/114; 318/629; 180/381; 267/140.14

(58) Field of Classification Search .................. 318/128, 318/135, 628, 629, 460, 448, 114, 623, 430, 318/434; 180/381; 310/51; 324/125, 154; 335/90; 267/140.14; 200/301; 381/71.12
See application file for complete search history.

(56) References Cited

U.S. PATENT DOCUMENTS

| | | | | |
|---|---|---|---|---|
| 5,154,403 A * | 10/1992 | Sato | ............................ | 267/141.2 |
| 5,360,080 A * | 11/1994 | Yamazaki | ...................... | 180/300 |
| 5,439,204 A * | 8/1995 | Yamazoe et al. | .......... | 267/140.14 |
| 5,647,579 A * | 7/1997 | Satoh | ....................... | 267/140.14 |
| 5,676,353 A * | 10/1997 | Jones et al. | ................ | 267/140.14 |
| 5,713,438 A * | 2/1998 | Rossetti et al. | ............... | 188/378 |
| 5,910,993 A * | 6/1999 | Aoki et al. | .................. | 381/71.12 |
| 5,939,625 A * | 8/1999 | Torii et al. | ................... | 73/117.01 |
| 6,018,689 A * | 1/2000 | Kumura et al. | ............... | 700/280 |
| 6,186,485 B1 * | 2/2001 | Kawazoe | .................. | 267/140.14 |
| 6,223,120 B1 * | 4/2001 | Williams | ....................... | 701/111 |
| 6,254,069 B1 * | 7/2001 | Muramatsu et al. | ...... | 267/140.14 |
| 6,256,545 B1 * | 7/2001 | Kimura et al. | .................. | 700/28 |
| 6,325,364 B1 * | 12/2001 | Muramatsu | .............. | 267/140.14 |
| 6,364,294 B1 * | 4/2002 | Gennesseaux et al. | .. | 267/140.13 |
| 6,631,895 B2 * | 10/2003 | Nemoto | ................... | 267/140.14 |
| 6,641,120 B2 * | 11/2003 | Nemoto | ................... | 267/140.14 |
| 6,809,486 B2 * | 10/2004 | Qiu et al. | ....................... | 318/135 |
| 7,017,889 B2 * | 3/2006 | Abe | ......................... | 267/140.15 |
| 7,071,638 B2 * | 7/2006 | Yasui et al. | .................... | 318/135 |
| 7,556,245 B2 * | 7/2009 | Ishiguro et al. | ........... | 267/140.14 |

FOREIGN PATENT DOCUMENTS

| | | |
|---|---|---|
| JP | 2001-140974 | 5/2001 |
| JP | 2002-139095 | 5/2002 |

* cited by examiner

*Primary Examiner* — Walter Benson
*Assistant Examiner* — Antony M Paul
(74) *Attorney, Agent, or Firm* — Carrier Blackman & Associates, P.C.; William D. Blackman; Joseph P. Carrier

(57) ABSTRACT

An active vibration isolation support system includes an electronic control unit which supplies a target electric current to an actuator to periodically drive the actuator in an expansion and contraction manner with a target vibration waveform. The controller sets the target electric current by synthesizing a driving primary electric current waveform corresponding to the target vibration waveform for the actuator with higher-order (driving secondary and/or tertiary) electric current waveforms which eliminate higher-order vibration components of the actuator corresponding to the driving primary electric current waveform. It is possible to alleviate a calculating load in the electronic control unit by ignoring the quaternary and still higher-order vibration components which less affect the target vibration waveform for the actuator.

3 Claims, 4 Drawing Sheets

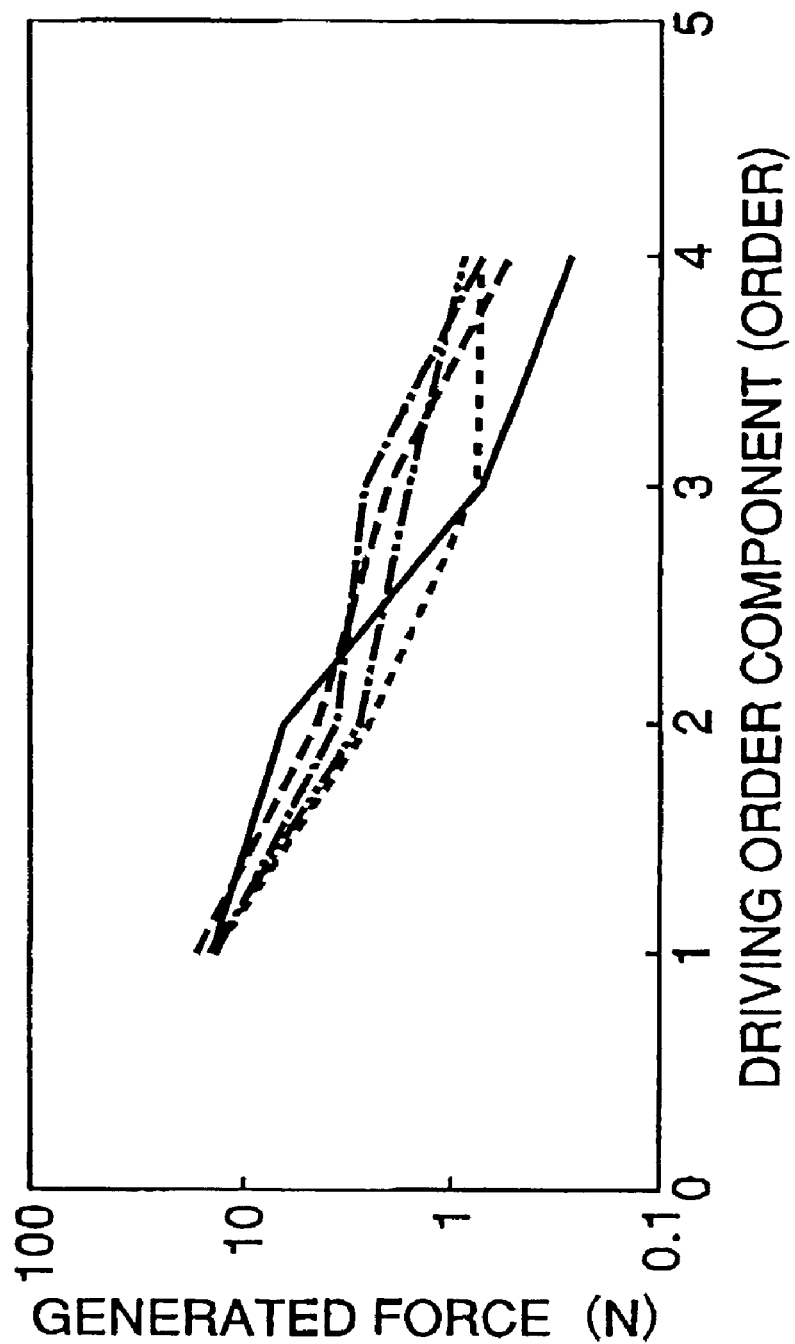

ACTUATOR DRIVE CONTROL DEVICE

RELATED APPLICATION DATA

Japanese priority application No. 2004-240916, upon which the present application is based, is hereby incorporated in its entirety herein by reference.

BACKGROUND OF THE INVENTION

1. Field of the Invention

The present invention relates to an actuator drive control device comprising a controller and an actuator, the controller supplying a target electric current to the actuator to periodically drive the actuator in an expanding and contracting manner with a target vibration waveform.

2. Description of the Related Art

Japanese Patent Application Laid-open No. 2002-139095 discloses an actuator drive control device, in which the driving cycle of an actuator is divided into a large number of very small time regions, and the duty ratios of the very small time regions are individually controlled, in order to drive a movable member of an active vibration isolation support system with a vibration waveform of a sine wave shape, so that a target electric current of a sine wave shape is supplied to the actuator.

In the case where an actuator using a solenoid is periodically driven in an expanding and contracting manner, an electric current waveform of a sine wave shape input to the actuator and a vibration waveform of the movable member of the actuator establish a nonlinear relationship therebetween, and a primary vibration waveform of a sine wave shape for the movable member is overlapped by higher-order vibration waveforms such as a secondary vibration waveform having a twofold frequency and a tertiary vibration waveform having a threefold frequency, so that it is disadvantageously difficult to vibrate the movable member of the actuator in an accurate sine wave shape.

SUMMARY OF THE INVENTION

Accordingly, it is an object of the present invention to ensure that an actuator can be driven accurately in an expansion and contraction manner with a target vibration waveform.

In order to achieve the above-mentioned object, according to a first feature of the invention, there is provided an actuator drive control device comprising: a controller; and an actuator; the controller supplying a target electric current to the actuator to periodically drive the actuator in an expanding and contracting manner with a target vibration waveform; and the controller setting the target electric current by synthesizing a driving primary electric current waveform corresponding to the target vibration waveform for the actuator, with a higher-order electric current waveform which eliminates a higher-order vibration component of the actuator depending on the driving primary electric current waveform.

According to a second feature of the present invention, in addition to the first feature, the higher-order electric current waveform includes at least one of a driving secondary electric current waveform and a driving tertiary electric current waveform.

According to a third aspect and feature of the present invention, in addition to the first feature, the actuator operates an active vibration isolation support system with the target vibration waveform depending on a vibration state of a vibrator.

An electronic control unit U in an embodiment corresponds to the control unit of the present invention.

With the arrangement of the first feature, the controller supplies a target electric current to the actuator to periodically drive the actuator in an expanding and contracting manner with a target vibration waveform; and synthesizes a driving primary electric current waveform corresponding to the target vibration waveform for the actuator, with a higher-order electric current waveform which eliminates a higher-order vibration component of the actuator depending on the driving primary electric current waveform, thereby setting a target electric current. Therefore, it is possible to cancel the higher-order vibration component(s) superimposed on the target vibration waveform for the actuator, thereby driving the actuator with the target vibration waveform with a good accuracy.

With the arrangement of the second feature, the higher-order electric current waveforms synthesized with the driving primary electric current waveform includes at least one of the driving secondary electric current waveform and the driving tertiary electric current waveform. Therefore, it is possible to alleviate the burden of the controller by ignoring the quaternary and still higher-order vibration components which are difficult to handle because of a high frequency and which only slightly affect the target vibration waveform for the actuator, while reliably canceling the secondary and tertiary vibration components which greatly affect the target vibration waveform for the actuator.

With the arrangement of the third feature, the actuator operates the active vibration isolation support system with the target vibration waveform depending on the vibration state of the vibrator. Therefore, it is possible to exhibit an effective vibration-damping force by the active vibration isolation support system, thereby effectively blocking transmission of the vibrations of the vibrator.

The above and other objects, features and advantages of the invention will become apparent from the following description of the present embodiment taken in conjunction with the accompanying drawings. It should be understood, however, that the detailed description of a specific example, while indicating the present embodiment of the invention, is given by way of illustration and not of limitation. Many changes and modifications may be made within the scope of the present invention without departing from the spirit thereof, and the invention includes all such modifications.

BRIEF DESCRIPTION OF THE DRAWINGS

FIG. 4 is a graph showing the magnitudes of a primary vibration component as well as secondary and still higher-order vibration components, upon supply of a driving primary electric current of a sine wave shape to an actuator.

DETAILED DESCRIPTION OF PRESENT EMBODIMENT

The present invention will now be described by way of an embodiment with reference to the accompanying drawings.

Figure 1:
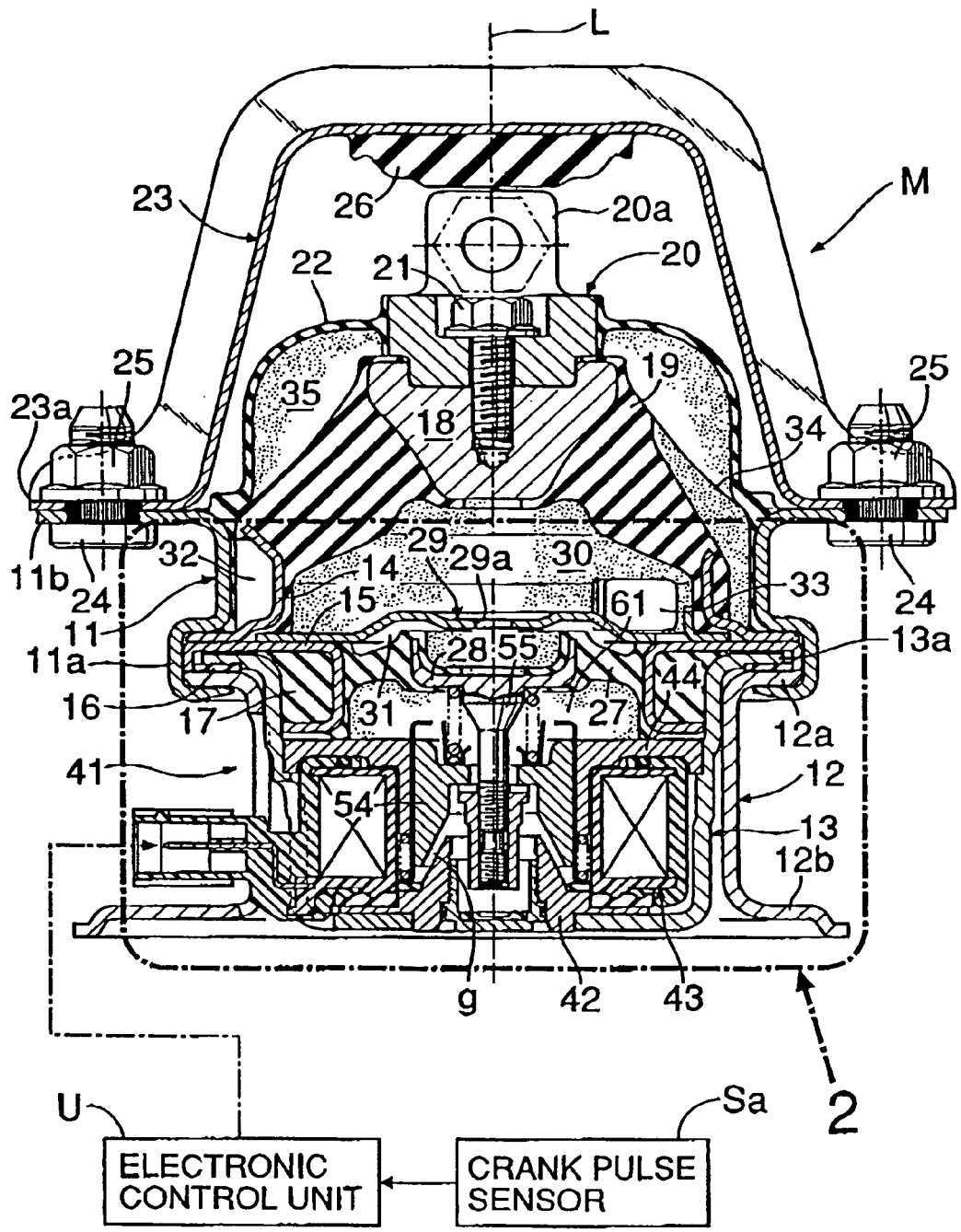
FIG. 1 is a vertical sectional view of an active vibration isolation support system according to one embodiment of the present invention.
Figure 2:
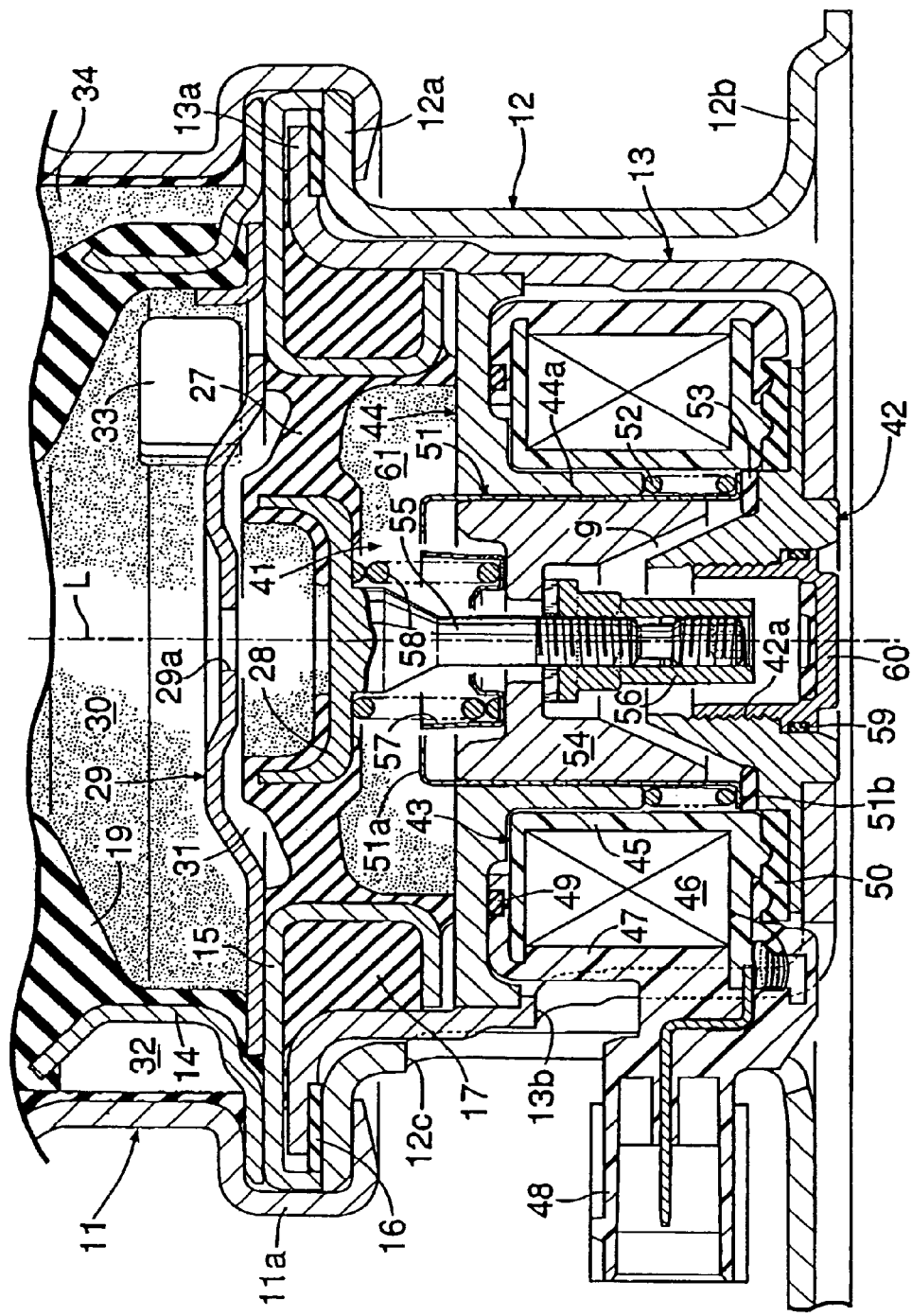
FIG. 2 is an enlarged view of Area 2 in FIG. 1.

FIGS. 1 and 2 show an active vibration isolation support system M (an active vibration control mount) used for elastically supporting an engine on a vehicle body frame of an automobile. The system M substantially has an axially symmetric structure with respect to an axis L. Between a flange portion 11a provided at a lower end of a substantially cylindrical upper housing 11 and a flange portion 12a provided at an upper end of a substantially cylindrical lower housing 12; a flange portion 13a at an outer periphery of a substantially cup-shaped actuator case 13 with its upper face opened, an outer peripheral portion of an annular first-elastic-member supporting ring 14, and an outer peripheral portion of an annular second-elastic-member supporting ring 15 are superposed on and coupled to one another by crimping. In this structure, an annular first floating rubber member 16 is interposed between the flange portion 12a of the lower housing 12 and the flange portion 13a of the actuator case 13; and an annular second floating rubber member 17 is interposed between an upper portion of the actuator case 13 and an inner surface of the second-elastic-member supporting ring 15, whereby the actuator case 13 is supported in a floating manner for movement relative to the upper housing 11 and the lower housing 12.

A first elastic member 19 formed of a thick rubber is bonded at its lower end and upper end by vulcanization bonding respectively to the first-elastic-member supporting ring 14 and a first-elastic-member supporting boss 18 disposed on the axis L. A diaphragm supporting boss 20 is fixed to an upper surface of the first-elastic-member supporting boss 18 by a bolt 21. A diaphragm 22 is bonded by vulcanization bonding along its inner peripheral portion to the diaphragm supporting boss 20, and then bonded by vulcanization bonding along its outer peripheral portion to the upper housing 11. An engine mounting portion 20a integrally formed on an upper surface of the diaphragm supporting boss 20 is fixed to an engine which is not shown. A vehicle body mounting portion 12b at a lower end of the lower housing 12 is fixed to the vehicle body frame which is not shown.

A flange portion 23a at a lower end of a stopper member 23 is coupled, by bolts 24 and nuts 25, to a flange portion 11b at an upper end of the upper housing 11. The engine mounting portion 20a projectingly provided on the upper surface of the diaphragm supporting boss 20 is abutably opposed to a stopper rubber 26 mounted on an inner surface of an upper portion of the stopper member 23. When a large load is input to the active vibration isolation support system M, the engine mounting portion 20a is brought into abutment against the stopper rubber 26, thereby suppressing excessive displacement of the engine.

A second elastic member 27 formed of a rubber membrane is bonded at its outer peripheral portion to the second-elastic-member supporting ring 15 by vulcanization bonding. A movable member 28 is embedded into and bonded by vulcanization bonding to a central portion of the second elastic member 27. A disk-shaped partition member 29 is fixed between an upper surface of the second-elastic-member supporting ring 15 and an outer peripheral portion of the first elastic member 19. A first liquid chamber 30 defined by the partition member 29 and the first elastic member 19 communicates with a second liquid chamber 31 defined by the partition member 29 and the second elastic member 27 through a communication bore 29a formed in a central portion of the partition member 29.

An annular communication passage 32 is formed between the first-elastic-member supporting ring 14 and the upper housing 11. One end of the annular communication passage 32 communicates through a communication bore 33 with the first liquid chamber 30, and the other end of the annular communication passage 32 communicates through a communication bore 34 with a third liquid chamber 35 defined by the first elastic member 19 and the diaphragm 22.

The structure of an actuator 41 for driving the movable member 28 will be described below.

A stationary core 42, a coil assembly 43 and a yoke 44 are mounted, sequentially from the bottom to the top, within the actuator case 13. The coil assembly 43 includes: a bobbin 45 disposed around an outer periphery of the stationary core 42; a coil 46 wound around the bobbin 45; and a coil cover 47 covering an outer periphery of the coil 46. The coil cover 47 is integrally formed with a connector 48 which extends to the outside through openings 13b and 12c formed in the actuator case 13 and the lower housing 12.

A seal member 49 is disposed between an upper surface of the coil cover 47 and a lower surface of the yoke 44. A seal member 50 is disposed between a lower surface of the bobbin 45 and an upper surface of the stationary core 42. These seal members 49 and 50 can prevent water and dust from entering an internal space 61 in the actuator 41 through the openings 13b and 12c formed in the actuator case 13 and the lower housing 12.

A thin-walled cylindrical bearing member 51 is vertically slidably fitted to an inner peripheral surface of a cylindrical portion 44a of the yoke 44. The bearing member 51 has an upper flange 51a formed at an upper end thereof and folded radially inwards, and a lower flange 51b formed at a lower end thereof and folded radially outwards. A set spring 52 is disposed under compression between the lower flange 51b and a lower end of the cylindrical portion 44a of the yoke 44. Therefore, a resilient force of the set spring 52 pushes, through an elastic member 53, the lower flange 51b against the upper surface of the stationary core 42, whereby the bearing member 51 is supported on the yoke 44.

A substantially cylindrical movable core 54 is vertically slidably fitted to an inner peripheral surface of the bearing member 51. A rod 55 extending downwards from the center of the movable member 28 is loosely passed through the center of the movable core 54, and a nut 56 is fastened to a lower end of the rod 55. A set spring 58 is disposed under compression between a spring seat 57 provided on an upper surface of the movable core 54 and a lower surface of the movable member 28. Therefore, the movable core 54 is fixed by being pushed against the nut 56 by a resilient force of the set spring 58. In this state, a lower surface of the movable core 54 and the upper surface of the stationary core 42 are opposed to each other with a conical air gap g provided therebetween. The rod 55 and the nut 56 are loosely fitted into an opening 42a formed in the center of the stationary core 42. The opening 42a is closed by a plug 60 with a seal member 59 interposed therebetween.

A crank pulse sensor Sa is connected to an electronic control unit U in order to detect a crank pulse which is output with the rotation of a crankshaft of the engine. The electronic control unit U controls the supply of electric current to the actuator 41 of the active vibration isolation support system M. The crank pulse of the engine is output 24 times per rotation of the crankshaft, namely, output one time at every crank angle of 15°.

The operation of the embodiment of the present invention having the above-described arrangement will be described below.

When an engine shake vibration of a low frequency is generated during traveling of the automobile, if the first elastic member 19 is deformed by a load input from the engine through the diaphragm supporting boss 20 and the first-elastic-member supporting boss 18 to change the volume of the first liquid chamber 30, a liquid is moved from one to the other between the first liquid chamber 30 and the third liquid chamber 35 which are connected to each other through the communication passage 32. When the volume of the first liquid chamber 30 is increased or decreased, the volume of the third liquid chamber 35 is correspondingly decreased or increased, but the change in volume of the third liquid chamber 35 is absorbed by the resilient deformation of the diaphragm 22. At this time, the vibration transmitted from the engine to the vehicle body frame can be effectively reduced, because the shape and size of the communication passage 32 and the spring constant of the first elastic member 19 are set so as to exhibit a low spring constant and a high damping force in a range of frequency of the engine shake vibration.

In the range of frequency of the engine shake vibration, the actuator 41 is maintained in a non-operative state.

If a vibration of a frequency higher than the engine shake vibration is generated, e.g., if a vibration is generated during idling due to the rotation of the crankshaft of the engine or if a vibration is generated in a cylinder cut-off state, the liquid within the communication passage 32 connecting the first liquid chamber 30 and the third liquid chamber 35 to each other is brought into a stuck state, so that it is impossible to exhibit a vibration-isolating function. Therefore, the actuator 41 is driven to exhibit the vibration-isolating function.

In order to exhibit the vibration-isolating function by operating the actuator 41 of the active vibration isolation support system M, the electronic control unit U controls the supply of electric current to the coil 46 based on a signal from the crank pulse sensor Sa.

Figure 3:
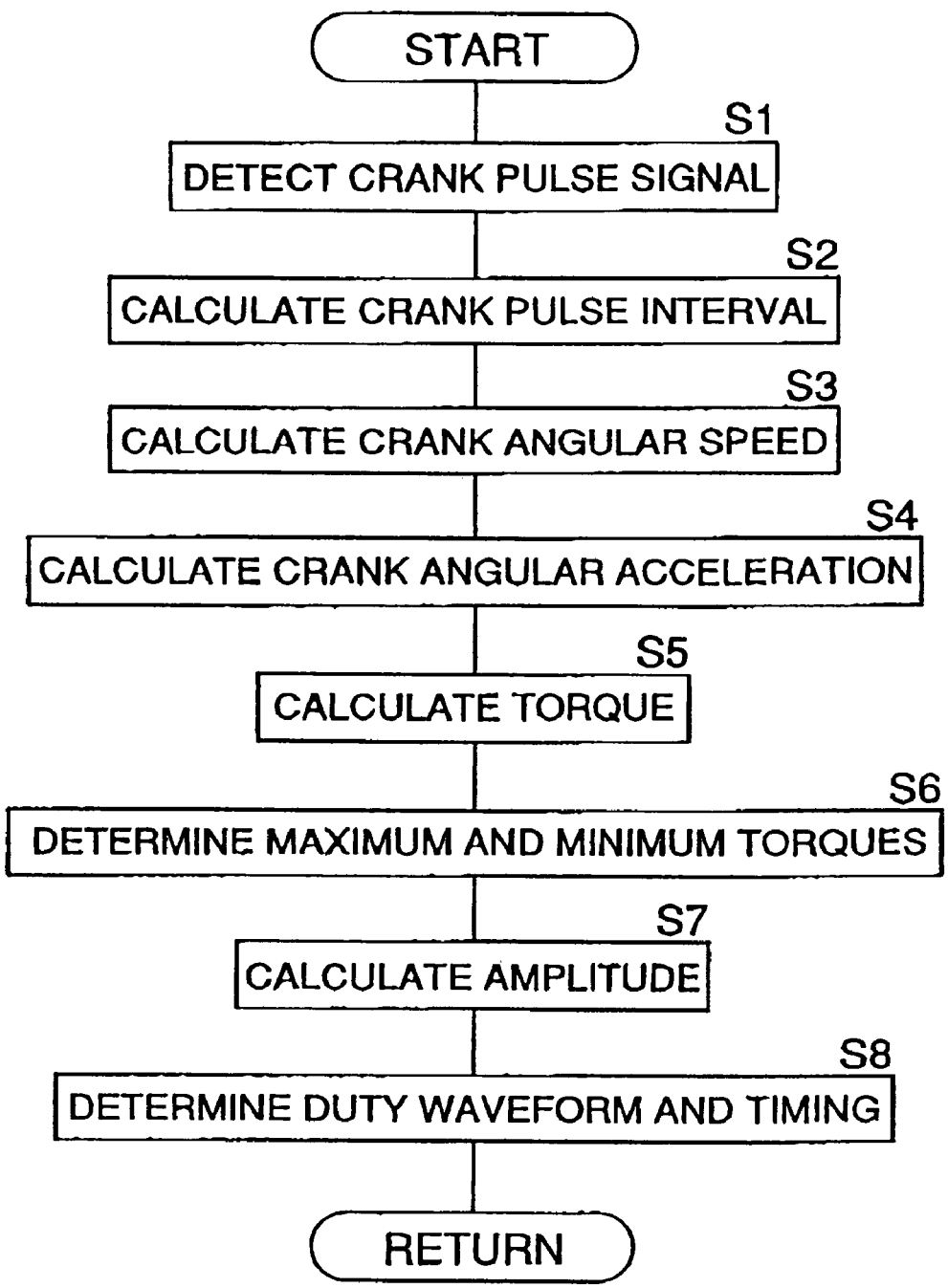
FIG. 3 is a flow chart for explaining operation of the system of FIG. 1.

More specifically, in a flow chart shown in FIG. 3, a crank pulse output at every crank angle of 15° from the crank pulse sensor Sa is first read at Step S1, and a time interval between the crank pulses is calculated at Step S2 by comparing the read crank pulse with a reference crank pulse (a TDC signal for a particular cylinder). At subsequent Step S3, a crank angular speed ω is calculated by dividing the crank angle of 15° by the time interval between the crank pulses. At Step S4, an angular acceleration dω/dt is calculated by time-differentiating the crank angular speed ω. At subsequent Step S5, a torque Tq around the crankshaft of the engine is calculated using an inertial moment I around the crankshaft of the engine according to the following equation:

$$Tq = I \times d\omega/dt$$

The torque Tq is zero, provided that the crankshaft is being rotated at a constant angular speed ω. However, the angular speed ω is increased by the acceleration of a piston at an expansion stroke, and the angular speed ω is decreased by the deceleration of the piston to generate a crank angular acceleration dω/dt at a compression stroke. Therefore, a torque Tq proportional to the crank angular acceleration dω/dt is generated.

At subsequent Step S6, a maximum value and a minimum value of each of time-wise adjacent torques are determined, and at Step S7, an amplitude in a position of the active vibration isolation support system M supporting the engine is calculated in terms of a difference between the maximum and minimum values of the torque, namely, an amount of torque changed. Then, at Step S8, a duty waveform and a timing (phase) of electric current applied to the coil 46 of the actuator 41 are determined.

Thus, when the engine is moved downwards relative to the vehicle body frame, causing the first elastic member 19 to deform downwards to decrease the volume of the first liquid chamber 30, if the coil 46 of the actuator 41 is excited with a timing matched to this action, the movable core 54 is moved downwards toward the stationary core 42 by an attracting force generated in the air gap g, and the second elastic member 27 deforms downwards by being pulled by the movable member 28 which is connected through the rod 55 to the movable core 54. As a result, the volume of the second liquid chamber 31 is increased, and hence the liquid in the first liquid chamber 30 compressed by a load from the engine is passed through the communication bore 29a in the partition member 29 into the second liquid chamber 31, thereby reducing the load transmitted from the engine to the vehicle body frame.

When the engine is then moved upwards relative to the vehicle body frame, causing the first elastic member 19 to deform upwards to increase the volume of the first liquid chamber 30, if the coil 46 of the actuator 41 is deexcited with a timing matched to this action, the attracting force generated in the air gap g is extinguished to allow the movable core 54 to move freely. Therefore, the second elastic member 27 deformed downwards is moved upwards to restore its original shape by its own resilient restoring force. As a result, the volume of the second liquid chamber 31 is decreased, and hence the liquid in the second liquid chamber 31 is passed through the communication bore 29a in the partition member 29 into the first liquid chamber 30, thereby allowing the engine to move upwards relative to the vehicle body frame.

In this way, the coil 46 of the actuator 41 is excited and deexcited in accordance with the cycle of the vibration of the engine, thereby generating an active vibration-damping force for preventing the vibration of the engine from being transmitted to the vehicle body frame.

A target vibration waveform of the movable member 28 reciprocally driven by the actuator 41 is a sine wave shape closely similar to a vibration waveform of the engine. However, in an actuator using a linear solenoid as in the actuator 41 of the present embodiment, even if sine-wave electric current is supplied to the actuator 41, the vibration waveform of the movable member 28 does not assume a sine wave shape, and higher-order vibration waveforms such as a secondary vibration waveform having a twofold frequency and a tertiary vibration waveform having a threefold frequency are superimposed on the sine-wave electric current, so that the generation of an effective vibration-damping force by the actuator 41 is disadvantageously obstructed.

FIG. 4 shows the magnitude of a primary vibration component as well as secondary and still higher-order vibration components generated by the active vibration isolation support system upon supply of the primary electric current of a sine wave shape to the actuator 41. It can be seen from FIG. 4 that the magnitude of quadratic and still higher-order vibration components are very small, as compared with tertiary and less vibration components.

Therefore, in the present embodiment, in consideration of a phase and a gain of the primary current waveform, correction is carried out by adding a secondary current waveform having a twofold frequency and a tertiary current waveform having a threefold frequency to a primary current waveform which has a sine wave shape of the actuator and which is determined from the vibration state of the engine; and a target electric current obtained through the correction is supplied to the actuator 41, whereby the movable member 28 is reciprocally driven in an accurate sine wave shape. By ignoring very small quadratic and still higher-order vibration components which are difficult to handle because of a high frequency, it is possible to ensure a necessary and sufficient vibration-damping effect, while alleviating the calculation load of the electronic control unit U.

When the target electric current for the actuator 41 is determined in the above-described manner, the target electric current is then supplied to the actuator 41 to actuate the active vibration isolation support system M. In this case, the target electric current is a feedforward control quantity determined based on the vibration state of the engine. That is, the control of the active vibration isolation support system M is basically a feedforward control. A sensor detects an actual electric current flowing through the actuator 41 to which the target electric current has been supplied, and a feedback control is carried out so that the actual electric current becomes identical with the target electric current. In this manner, the actual electric current supplied to the actuator 41 can be made identical with the target electric current with a good accuracy.

Although the embodiment of the present invention has been described in detail, the present invention is not limited to the above-described embodiment, and various modifications in design may be made without departing from the subject matter of the invention defined in the claims.

For example, the actuator 41 in the embodiment is applied to the active vibration isolation support system M for supporting the engine of the automobile, but the invention is applicable to an active vibration isolation support system M for any other purpose and also to any object other than the active vibration isolation support system M.

Further, while both the driving secondary and tertiary electric current waveforms are synthesized with (added to) the driving primary electric current waveform in the above embodiment, it is possible to synthesize either the driving secondary electric current waveform or the driving tertiary electric current waveform with the driving primary electric current waveform.

What is claimed is:

1. An actuator drive control device comprising:
   a controller;
   an actuator; and
   a movable member driven by the actuator;
   wherein the controller supplies an electric current to the actuator and corrects the electric current such that the corrected electric current becomes a target electric current which causes the actuator to drive the movable member with a vibration waveform of a sine wave shape;
   wherein the target electric current is determined by adding together a driving primary electric current waveform input to the actuator with a higher-order electric current waveform which eliminates a higher-order vibration component of the actuator depending on the driving primary electric current waveform.

2. An actuator drive control device according to claim 1, wherein the higher-order electric current waveform includes at least one of a driving secondary electric current waveform and a driving tertiary electric current waveform.

3. An actuator drive control device according to claim 1, wherein the higher-order electric current waveform includes only a driving secondary electric current waveform and/or a driving tertiary electric current waveform.

* * * * *